United States Patent
Jiang et al.

(10) Patent No.: US 11,616,759 B2
(45) Date of Patent: Mar. 28, 2023

(54) INCREASED COVERAGE OF APPLICATION-BASED TRAFFIC CLASSIFICATION WITH LOCAL AND CLOUD CLASSIFICATION SERVICES

(71) Applicant: Palo Alto Networks, Inc., Santa Clara, CA (US)

(72) Inventors: Mengying Jiang, Campbell, CA (US); Shengming Xu, San Jose, CA (US); Menglan Fang, Milpitas, CA (US); Ho Yu Lam, Santa Clara, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/445,987

(22) Filed: Aug. 26, 2021

(65) Prior Publication Data
US 2022/0329565 A1    Oct. 13, 2022

Related U.S. Application Data

(60) Provisional application No. 63/173,251, filed on Apr. 9, 2021.

(51) Int. Cl.
*G06F 15/173*    (2006.01)
*H04L 9/40*    (2022.01)
*H04L 47/2441*    (2022.01)

(52) U.S. Cl.
CPC ...... *H04L 63/0236* (2013.01); *H04L 47/2441* (2013.01); *H04L 63/1425* (2013.01); *H04L 63/20* (2013.01)

(58) Field of Classification Search
CPC ............. H04L 63/0236; H04L 47/2441; H04L 63/1425; H04L 63/20
(Continued)

(56) References Cited

U.S. PATENT DOCUMENTS 7,331,061 B1 * 2/2008 Ramsey .............. H04L 63/1441
726/13
8,892,665 B1 * 11/2014 Rostami-Hesarsorkh ...................
H04L 63/02
709/224
(Continued)

FOREIGN PATENT DOCUMENTS

EP    3739813 A1    11/2020
KR    20170073289    *    6/2017    ......... H04L 63/0209

OTHER PUBLICATIONS

Huang, et al., "On the Cloud-based Network Traffic Classification and Applications Identification Service", IEEE, 2012 International Conference on Selected Topics in Mobile and Wireless Networking, Jul. 2012, pp. 36-41.
(Continued)

*Primary Examiner* — Liang Che A Wang
(74) *Attorney, Agent, or Firm* — Gilliam IP PLLC (57) ABSTRACT

A cloud-based traffic classification engine maintains a catalog of application-based traffic classes which have been developed based on known applications, and a local traffic classification engine maintains a subset of these classes. Network traffic intercepted by the firewall which cannot be classified by the local engine is forwarded to the cloud-based engine for classification. Upon determination of a class of the traffic, the cloud-based engine forwards the determined class and corresponding signature to the local engine. The firewall maintains a cache which is updated with the signatures corresponding to the class communicated by the cloud-based engine. Subsequent network traffic sent from the application can be determined to correspond to the application and classified according locally at the firewall based on the cached signatures. Localization of the cache to the firewall reduces latency of traffic classification operations as (Continued)

the catalog of classification information stored in the cloud scales.

20 Claims, 9 Drawing Sheets

(58) Field of Classification Search
USPC .................................................. 709/223, 224
See application file for complete search history.

(56) References Cited

U.S. PATENT DOCUMENTS

| | | | |
|---|---|---|---|
| 9,294,492 B1* | 3/2016 | Martini | H04L 63/0876 |
| 9,614,773 B1* | 4/2017 | Tagore | H04L 47/2441 |
| 9,729,571 B1* | 8/2017 | Ferguson | H04L 63/1441 |
| 10,757,074 B2* | 8/2020 | Zuk | H04L 69/22 |
| 10,855,656 B2* | 12/2020 | Ashley | H04L 63/0876 |
| 2002/0105910 A1 | 8/2002 | Maher, III et al. | |
| 2015/0007317 A1 | 1/2015 | Jain | |
| 2019/0364066 A1* | 11/2019 | Jin | G06F 16/2453 |
| 2022/0103595 A1* | 3/2022 | Scherer | H04L 63/0263 |

OTHER PUBLICATIONS

PCT Application No. PCT/US2022/071543 International Search Report, dated Jun. 24, 2022, 3 pages.
PCT Application No. PCT/US2022/071543 Written Opinion, dated Jun. 24, 2022, 10 pages.

* cited by examiner

INCREASED COVERAGE OF APPLICATION-BASED TRAFFIC CLASSIFICATION WITH LOCAL AND CLOUD CLASSIFICATION SERVICES

BACKGROUND

The disclosure generally relates to transmission of digital information and to network architectures or network communication protocols for network security.

As part of enforcing security policies, firewalls implement traffic classification. Firewalls commonly classify network traffic based on port, network protocol, or a combination thereof. Firewalls may also perform deep packet inspection, or packet sniffing, as part of classifying network traffic. With deep packet inspection, the content of network packets is inspected, which facilitates content-based classification of network traffic based on matching signatures generated from data communicated via network packets.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. In other instances, well-known instruction instances, protocols, structures and techniques have not been shown in detail in order not to obfuscate the description.

Overview

A firewall-based traffic classification engine analyzes network traffic based on classification information stored locally on the firewall to classify network traffic by application. Network traffic can be classified by application based on evaluating the network traffic against signatures representing applications and classifying the network traffic into a class corresponding to the application represented by a matching signature. Although local traffic classification services provide for application-based policy enforcement regardless of whether detection evasion techniques are in place, the number of signatures which can be stored locally and leveraged with this approach as well as the ability to scale up as new signatures are created is limited due to hardware limitations of the firewall.

Disclosed herein are techniques for expanding coverage of traffic classification services with a combination of functionality provided by a traffic classification engine running locally on a firewall and a cloud-based traffic classification engine running in the cloud. The cloud-based engine maintains a catalog of applications by which network traffic can be classified and corresponding signatures which have been developed, and the local engine maintains a subset of this catalog which may represent the most popularly used or frequently accessed applications. Network traffic intercepted by the firewall which cannot be classified by application based on the information locally available to the local engine is forwarded to the cloud-based engine for classification based on the larger catalog of applications by which network traffic can be classified. Upon classification of the traffic into a class representing an application based on signature matching, the cloud-based engine forwards the determined class which indicates the corresponding application and the matching signature to the local engine. The firewall maintains a cache which is updated with signatures and indications of the corresponding applications communicated by the cloud-based engine which were not included in the classification information originally installed on the firewall. Subsequent network traffic exchanged during sessions involving the application indicated by the class can be classified accordingly by the local engine based on the cached signatures. Localization of the cache to the firewall through caching of signatures determined based on network traffic which it intercepts reduces latency of local traffic classification operations even as the catalog of classification information stored in the cloud scales up. Additionally, extending traffic classification to the cloud where the catalog of classification information is maintained increases the scope of applications according to which network traffic can be classified, thus reducing the amount of network traffic that passes as unknown traffic and improving application-based security policy enforcement at the firewall.

Network traffic of an application for which a signature has not yet been determined and thus cannot be classified by the local engine or the cloud-based engine can be forwarded to a signature creation service by the cloud-based engine. Because creation of application signatures is conventionally achieved through manual efforts of setting up an application environment and capturing network traffic, eliminating this step with automated forwarding of detected network traffic directly to the signature creation service reduces the expenses and associated challenges of manual research and development for creation of new signatures.

Example Illustrations

Figure 1:
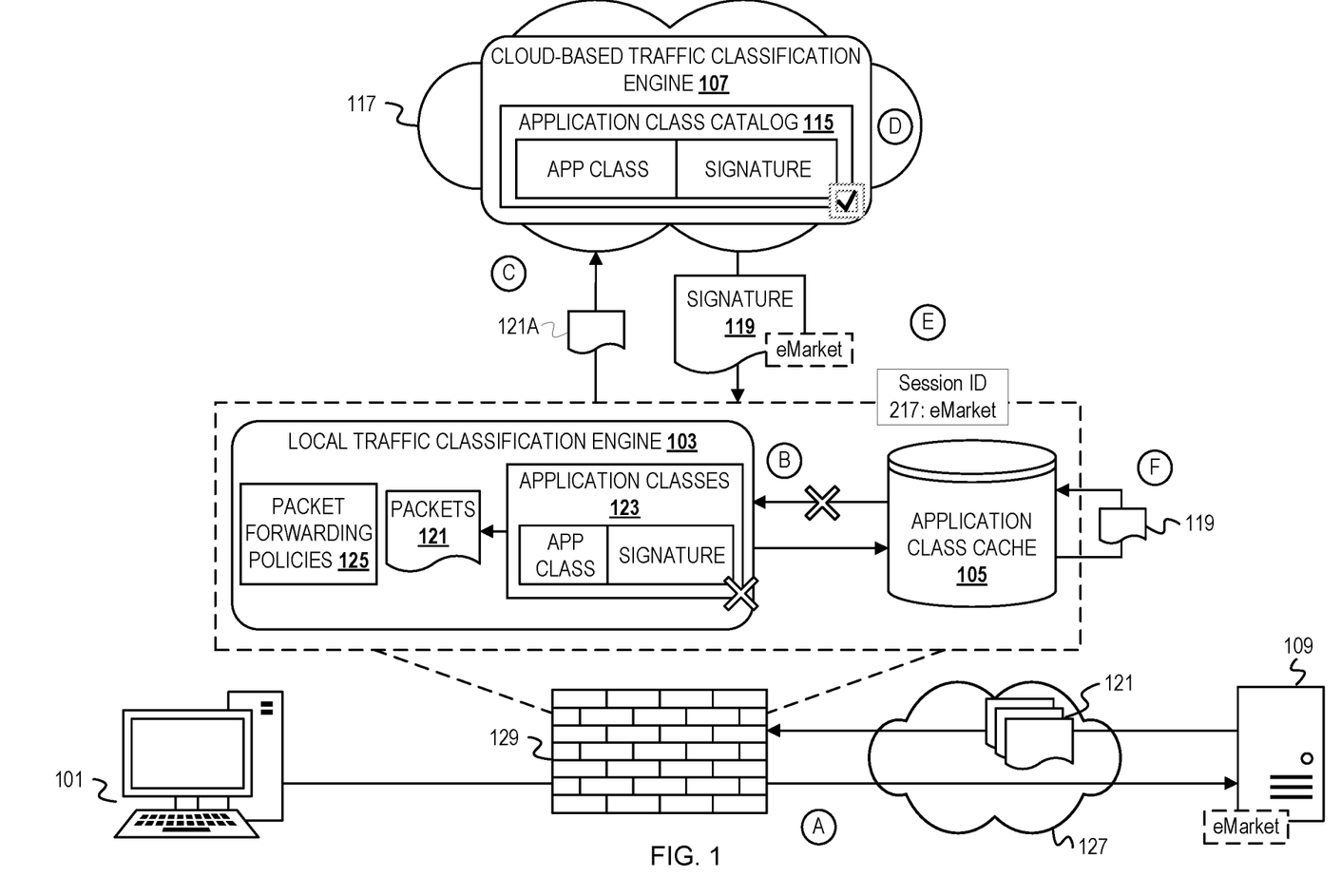
FIG. 1 depicts a conceptual diagram of combining local and cloud-based traffic classification for low latency classification of network traffic by application.

FIG. 1 depicts a conceptual diagram of combining local and cloud-based traffic classification for low latency classification of network traffic by application. A firewall 129 monitors and controls network traffic incoming and outgoing over a network 127 for a client 101. A local traffic classification engine ("local engine") 103 which executes as part of the firewall 129 classifies detected network traffic by corresponding application. A cloud-based traffic classification engine ("cloud-based engine") 107 runs in a cloud 117. For instance, the cloud-based engine 107 may run on one or more nodes (e.g., physical machines and/or virtual machines) available in the cloud 117. The firewall 129 maintains an application class cache ("cache") 105 which stores traffic classification information communicated to the local engine 103 from the cloud-based engine 107.

FIG. 1 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the firewall 129 detects a session initiated by a client 101 with a server 109 which maintains resources of an application named "eMarket." The application "eMarket" may be a web application running on the server 109 and to which the client 101 requests access. The firewall 129 detects packets 121 sent from the server 109 to the client 101. Detection of the network traffic sent between the client 101 and server 109 triggers the local engine 103 to evaluate the packets 121 and/or the request issued by the client 101 to classify the network traffic by application so that security policies which designate the appropriate application can be applied.

At stage B, the local engine 103 evaluates the packets 121 and determines whether the packets 121 can be classified into an application class. The local engine 103 maintains application classes 123 which comprise classes of network traffic representing applications. Each of the classes of network traffic defined in the application classes 123 which represents an application also has associated a signature for packets of that application. The signatures included in the application classes 123 can include application signatures and/or context-based signatures applied as part of packet decoding. The local engine 103 determines if the packets 121 can be classified into one of the application classes 123 based on evaluating signatures of the application classes 123 against the packets 121 to determine if one of the signatures matches the packets 121. The local engine 103 may also read signatures corresponding to application classes from the cache 105 and evaluate the signatures which are read against the packets 121 to determine if a cached signature matches the packets 121 and the packets 121 can thus be classified into the corresponding application class. The local engine 103 in this example determines that the packets 121 cannot be classified into one of the classes maintained locally in the application classes 123 and the cache 105; that is, neither the application classes 123 nor the cache 105 include an application class and associated signature representing the application named "eMarket."

At stage C, the local engine 103 forwards at least a packet 121A of the packets 121 to the cloud-based engine 107 for classification. The local engine 103 can forward all, a subset, or one of the packets 121 to the cloud-based engine 107 as specified by packet forwarding policies 125. The packet forwarding policies 125 may also indicate a portion of a payload which the local engine 103 should forward to the cloud-based engine 107 (e.g., based on an offset value(s), certain fields of the packet, etc.). Packets which go unclassified by the local engine 103 initially are forwarded to the cloud-based engine 107 for further evaluation based on an application class catalog ("catalog") 115. The catalog 115 comprises an extensive set of defined application classes and corresponding application signatures, context-based signatures, etc. The application classes 123 accessed locally by the local engine 103 includes a subset of the application classes stored in the catalog 115, so forwarding packets which are not classified into one of the application classes 123 to the cloud-based engine 107 expands the scope of applications by which packets can be classified.

At stage D, the cloud-based engine 107 evaluates the packet 121A and determines whether the packet 121A can be classified into one of the application classes included in the catalog 115. For instance, the cloud-based engine 107 can evaluate the packet 121A against the signatures associated with application classes stored in the catalog to determine if a match can be identified. In this example, the signature representing the application "eMarket" is not included in the application classes 123 but is included in the catalog 115. The cloud-based engine 107 thus determines that the packet 121A can be classified into an application class which corresponds to the application "eMarket" based on applying the signatures included in the catalog 115 and determining that a signature 119 representing the application "eMarket" matches the packet 121A.

At stage E, the cloud-based engine 107 communicates to the local engine 103 an indication of the application class representing the application "eMarket" and the corresponding signature 119. The local engine 103 obtains the signature 119 and indication of the application class corresponding to the application "eMarket" from the cloud-based engine 107 and classifies the packets 121 into the application class for "eMarket." As part of classifying the packets 121, the local engine 103 can associate a session ID for the session between the client 101 and the server 109 with the indication of the application class into which the packets 121 were classified so that the packets 121 and any subsequent packets communicated during the session are associated with the application class representing the application "eMarket." Classification of the packets 121 into the application-based traffic class allows the firewall 129 to subsequently apply fine-grained policies defined specifically for the application class corresponding to the application "eMarket."

At stage F, the local engine 103 updates the cache 105 with the indication of the application class and the signature 119 communicated from the cloud-based engine 107. The local engine 103 writes the signature 119 and the corresponding application class defined for the application "eMarket" to the cache 105. Upon detection of packets sent as part of subsequent sessions between the client 101 and server 109 for accessing content of the application "eMarket," the local engine 103 will be able to classify the packets into the appropriate application class locally based on reading the signature 119 from the cache 105 and evaluating packets exchanged during the session against the signature 119 rather than sending the packets to the cloud-based engine 107 for classification.

Figure 2:
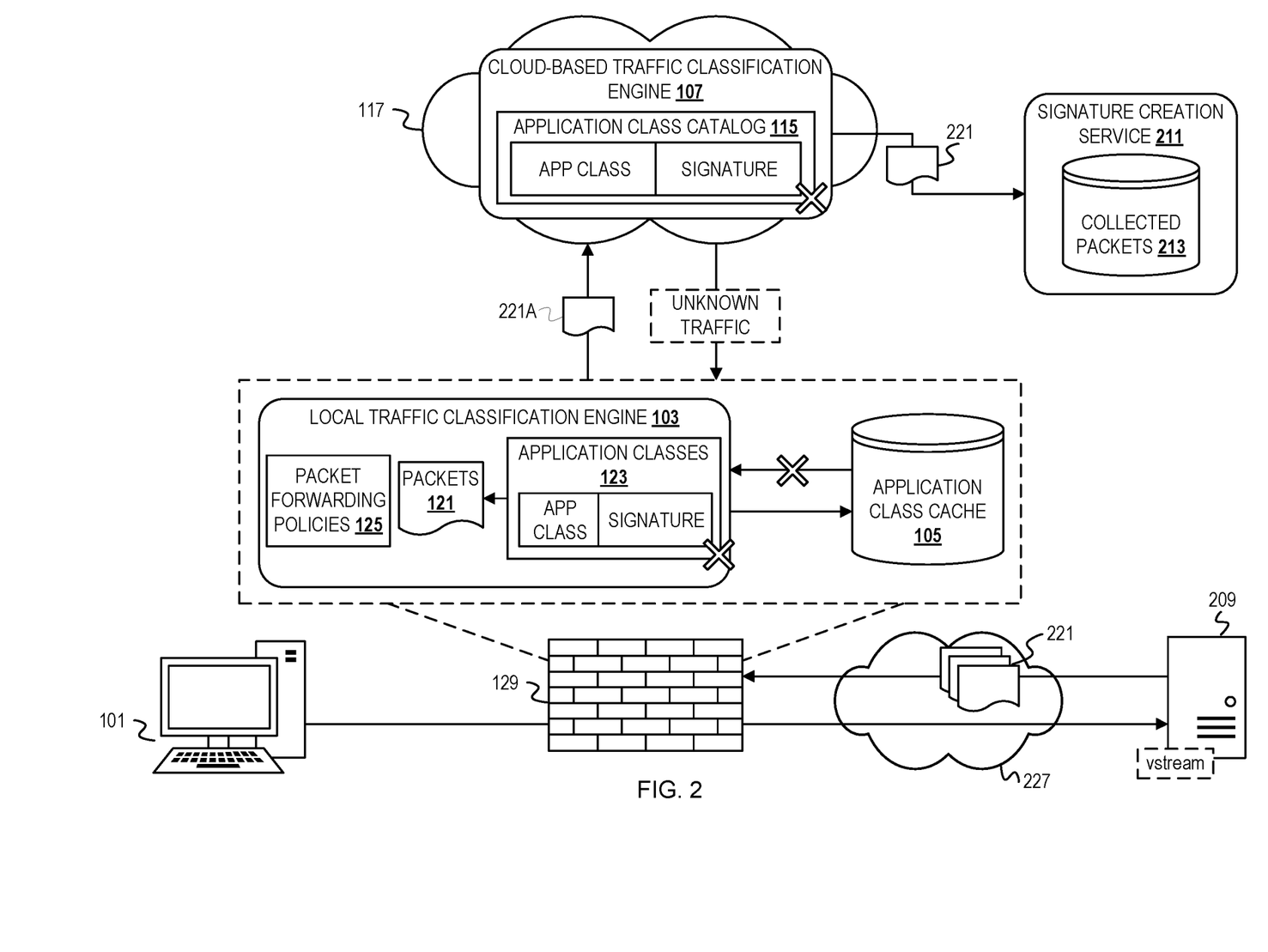
FIG. 2 depicts a conceptual diagram of automated collection of unclassified network traffic for application signature creation.

FIG. 2 depicts a conceptual diagram of automated collection of unclassified network traffic for application signature creation. While collection of network traffic of an application for application signature creation is conventionally a laborious manual task, the local engine 103 and cloud-based engine 107 can be utilized to automate collection of this network traffic. FIG. 2 depicts an example in which the local engine 103 and the cloud-based engine 107 determine whether packets 221 of a session between the client 101 and a server 209, which stores resources of an application named "vstream," can be classified into an application class.

The local engine 103 sends at least a packet 221A of the packets 221 as specified by the packet forwarding policies 125 to the cloud-based engine 107. The local engine 103 determines that the packets 221 cannot be classified into one of the application classes 123 or application classes for which signatures are read from the cache 105 as similarly described in reference to FIG. 1. The cloud-based engine 107 then determines that the packet 221A cannot be classified into one of the application classes included in the catalog 115. For instance, signatures representing the application "vstream" may not yet have been created and inserted into the catalog 115. The cloud-based engine 107 communicates to the local engine 103 that the packets 221 should be classified as unknown traffic and policies of the firewall 129 applied accordingly.

Based on determining that the packet 221A could not be classified into an application class in the catalog 115, the cloud-based engine 107 designates the packet 221A for application signature creation by forwarding the packet 221A to a signature creation service 211. The signature creation service 211 may execute on a server external to the cloud 217 and the firewall 219. The cloud-based engine 107 may send additional packets of the packets 221 (e.g., in addition to the packet 221A) to the signature creation service 211 for storage in a repository 213 of collected packets. The cloud-based engine 107 can include additional identifying information of the packets 221 in the communication to the signature creation service 211, such as source address, destination address, port number, and/or network protocol, so that similar packets which would be classified into the same application class can be grouped for signature creation. Forwarding the packets 221 to the signature creation service 211 allows for subsequent creation of a signature for the application named "vstream." Later, once an application signature representing the application "vstream" has been created, the signature and indication of the application class corresponding to "vstream" can be inserted into the catalog 115 and/or the application classes 123. As a result, the local engine 103 and the cloud-based engine 107 can later classify detected into the application class representing "vstream."

Figure 3:
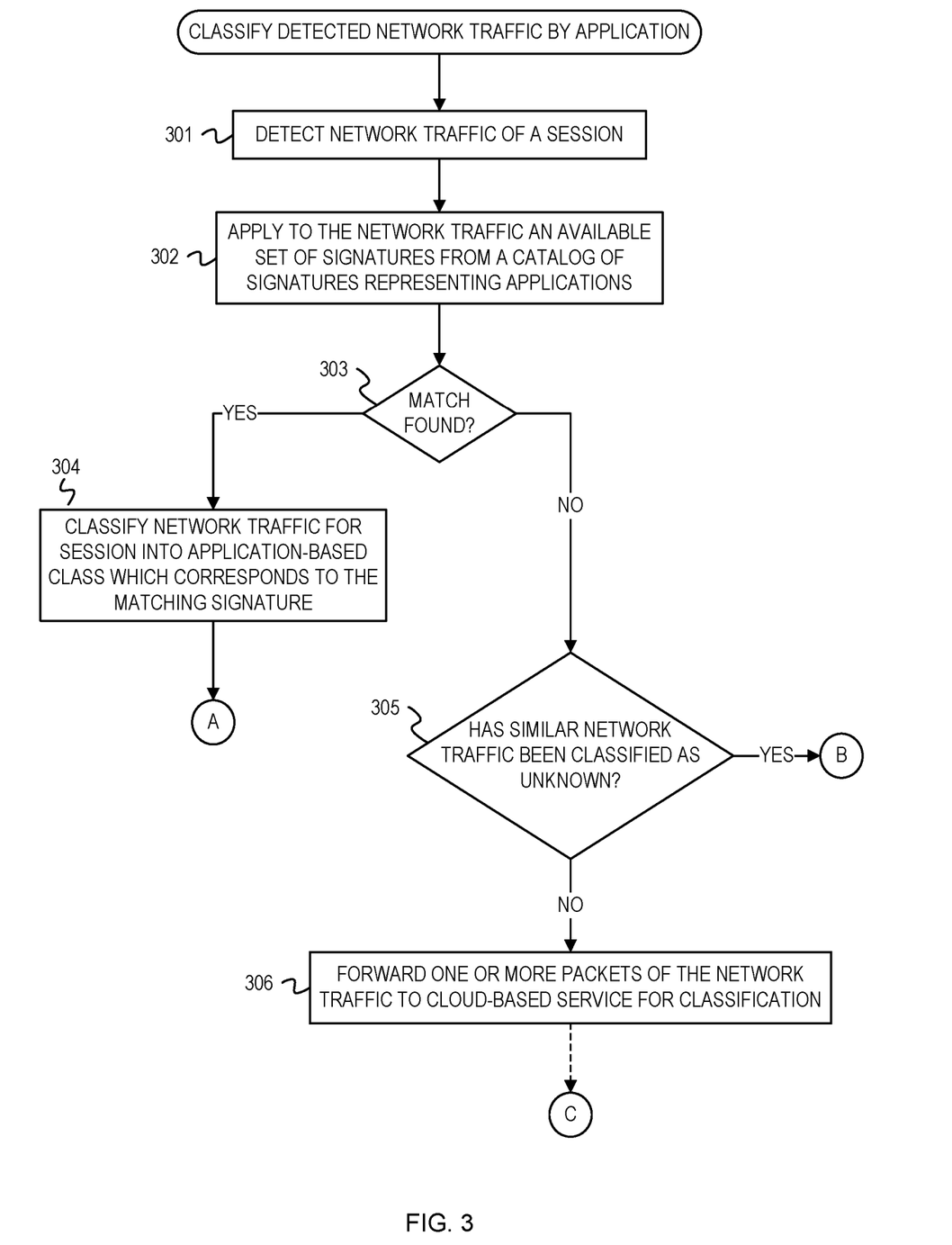
FIGS. 3-4 are a flowchart of example operations for classifying detected network traffic by application.
Figure 4:
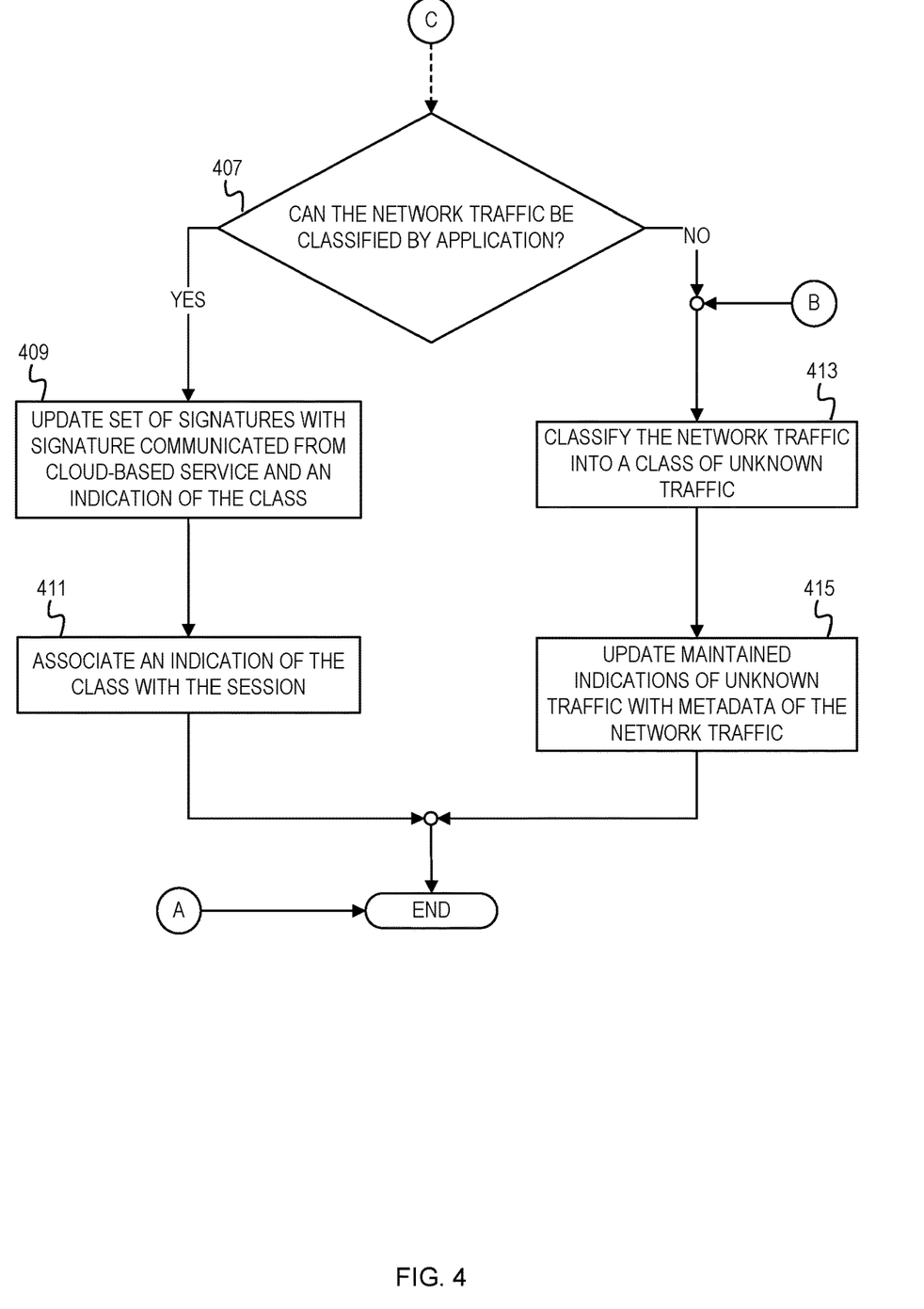
Figure 5:
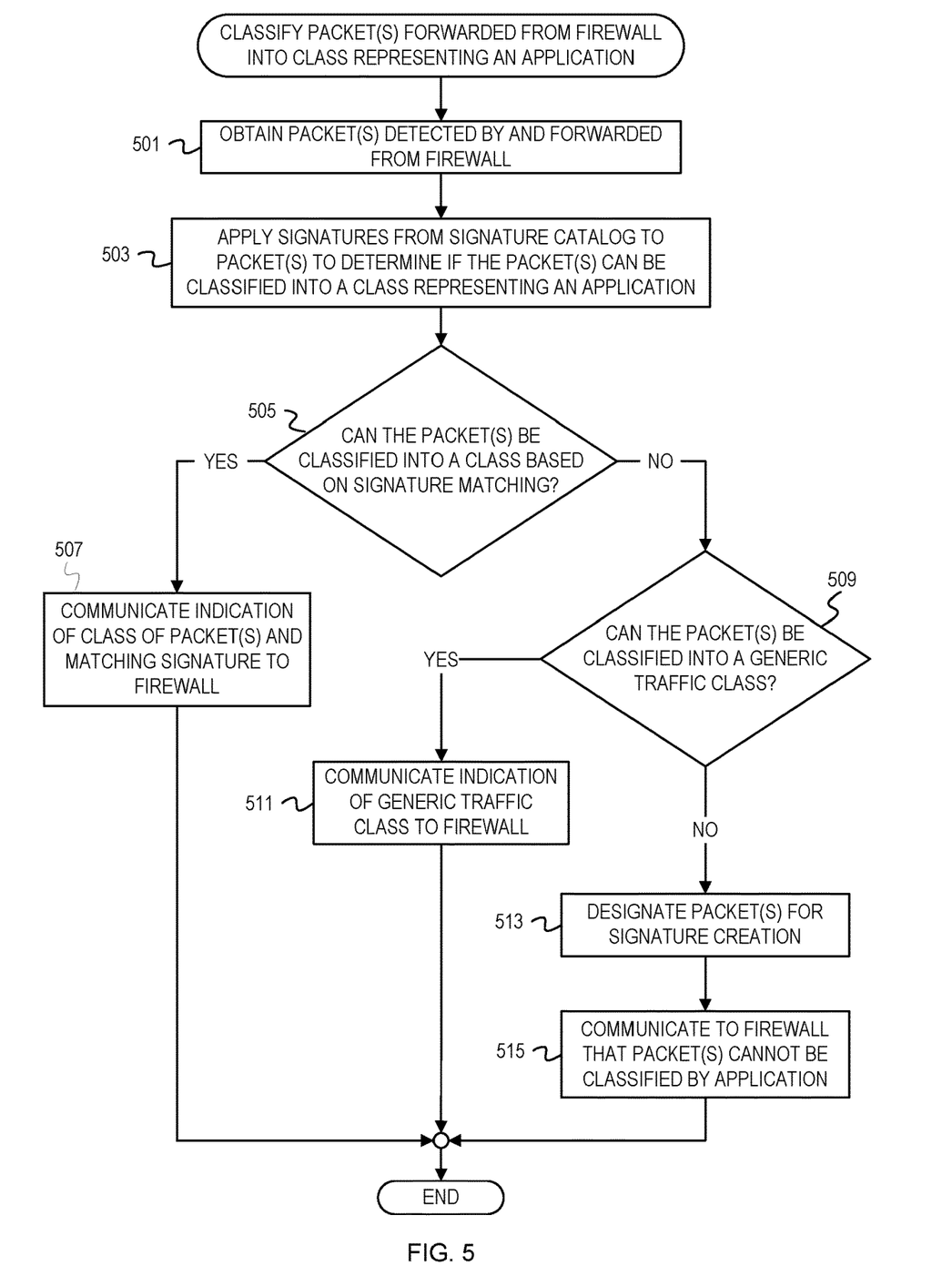
FIG. 5 is a flowchart of example operations for classifying packets forwarded from a firewall into a class representing an application.

FIGS. 3-5 are flowcharts of example operations for increased coverage of application-based traffic classification by utilizing local and cloud-based traffic classification engines. The example operations are described with reference to a local traffic classification engine (hereinafter "local engine") and a cloud-based traffic classification engine (hereinafter "cloud engine") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIGS. 3-4 are a flowchart of example operations for classifying detected network traffic by application. The example operations in FIG. 3 are performed by the local engine that can execute as part of a firewall. At block 301, the local engine detects network traffic of a session. The network traffic may be a request for accessing an application issued from a client initiating the session to a server, data sent from the server to the client as a response, a combination thereof, etc.

At block 302, the local engine applies an available set of signatures from a catalog of signatures representing applications to the network traffic. Applying the set of signatures to the network traffic refers to evaluating the signatures against the network traffic to determine if a matching signature can be found. The catalog of signatures includes indications of a plurality of applications by which network traffic can be classified and a plurality of signatures, such as application signatures and/or protocol-based signatures, representing corresponding ones of the plurality of applications. Each of the signatures representing an application may be indicated as a criterion for classifying network traffic into a class corresponding to that application. The set of signatures available to the local engine is a subset of this catalog of signatures which can be accessed locally and may be the signatures representing the most popular or commonly accessed applications. The set of signatures applied to the network traffic may also include signatures read from a signature cache maintained for the firewall. The local engine may apply the set of signatures or different subsets thereof at one or more stages of classifying network traffic. For instance, the local engine may apply application signatures to the network traffic at a first stage and may then apply additional signatures corresponding to a communication protocol associated with the network traffic as part of traffic decoding at a second stage (e.g., signatures for Hypertext Transfer Protocol (HTTP) traffic, File Transfer Protocol (FTP) traffic, etc.).

At block 303, the local engine determines if a matching signature was found as a result of applying the set of signatures to the network traffic. The local engine determines if the network traffic matched to a first of the signatures. Identifying a matching signature contributes to classification of the network traffic into a class corresponding to the application having the matching signature. If a match was found, operations continue at block 304. If a match was not found, operations continue at block 305.

At block 304, the local engine classifies the network traffic for the session into an application-based class which corresponds to the matching signature. The application-based class may correspond to a specific application or a group of applications (e.g., applications belonging to an application suite). Classifying the network traffic can include the local engine associating a session ID of the session with an indication of the class into which the network traffic was classified so that subsequent packets detected during the session are also associated with the determined class. Security policies defined specifically for the application can be applied to the network traffic and any network traffic subsequently detected during the session. Operations continue at transition point A, which continues at transition point A of FIG. 4.

At block 305, the local engine determines if similar network traffic has previously been classified as unknown traffic. The local engine may maintain indications of network traffic which was classified as unknown traffic based on prior local and cloud-based classification to reduce repeated uploads of unknown network traffic having the same characteristics to the cloud and therefore reduce costs. For instance, the indications of unknown traffic can include combinations of source address, destination address, port number, and/or network protocol associated with unknown network traffic and may be stored in an additional cache maintained for the firewall. The local engine can evaluate metadata of the network traffic (e.g., based on a header(s) of the network traffic) against the indications of unknown network traffic to determine if previously detected network traffic having a same combination of source address, destination address, port number and/or network protocol was classified as unknown traffic. If no similar network traffic has been classified as unknown, operations continue at block 306. If similar network traffic has been classified as unknown, operations continue at transition point B, which continues at transition point B of FIG. 4.

At block 306, the local engine forwards one or more packets of the network traffic to a cloud-based service for classification. Policies attached to (e.g., installed on or otherwise accessible to) the local engine can dictate a portion of the network traffic which should be forwarded/uploaded to the cloud-based service. For instance, the policies can dictate whether one detected packet or each detected packet of which the network traffic is comprised should be forwarded to the cloud-based service. The policies can also denote a portion of packets that should be forwarded to the cloud. As an example, the policies may indicate that the entirety of the payloads should be forwarded or a certain portion of the payloads. The operations which the cloud-based service performs based on receiving network traffic forwarded from the local engine are described in reference to FIG. 5. Operations continue at transition point C, which continues at transition point C of FIG. 4.

At block 407, the local engine determines if the network traffic can be classified by application. The local engine determines if the network traffic can be classified into a class corresponding to an application based on obtaining an indication from the cloud-based service of how the forwarded packet(s) could be classified. The local engine may obtain an indication of a class which represents an application and a corresponding signature to which the forwarded packet(s) matched if the forwarded packet(s) can be classified by application. If the forwarded packet(s) could not be classified by application, the local engine may obtain an indication from the cloud-based service that the forwarded packet(s) can be classified as unknown traffic. If the network traffic could be classified into a traffic class representing an application, operations continue at block 409. If the network traffic could not be classified into a traffic class representing an application, operations continue at block 413.

At block 409, the local engine updates the set of signatures with the signature communicated from the cloud-based service and an indication of the class. For instance, the local engine can write the signature communicated from the cloud-based service at block 407 and an indication of the corresponding application to a signature cache so that the signature can be accessed locally for subsequent traffic classification events. The signature written to the cache can be a content-based signature and/or a context-based signature representing the application. The indication of the class can be a name, identifier (ID), etc. of the class, which may correspond to a name, ID, etc. of the application which it represents. Later, upon subsequent detection of network traffic during a different session involving the application, the local engine can read the signature from the cache and classify the network traffic accordingly at block 303 instead of forwarding the network traffic to the cloud-based service for classification.

At block 411, the local engine associates an indication of the class with the session. For instance, the local engine can associate the name, ID, etc. of the class with a session ID for the session maintained by the local engine. Associating the indication of the traffic class with the session effectively classifies network traffic communicated as part of the session with that session ID into the class. Security policies defined specifically for the application based on designating the class can then be applied to network traffic of the session.

At block 413, the local engine classifies the network traffic into a class of unknown traffic. The local engine can associate a name, ID, etc. used for the unknown traffic class with the session (e.g., with a session ID of the session) so that any network traffic exchanged during that session can be handled as unknown traffic and the corresponding security policies defined for unknown traffic applied.

At block 415, the local engine updates the maintained indications of unknown traffic with metadata of the network traffic. The local engine may add a new entry in the indications of unknown traffic (e.g., write a new entry in the cache) which indicates the source address, destination address, port number, and/or network protocol associated with the network traffic which may be determined based on a header(s) of the network traffic and based on decoding the network traffic. Subsequently detected network traffic associated with a similar combination of these metadata can be identified as likely being unknown at block 305.

FIG. 5 is a flowchart of example operations for classifying packets forwarded from a firewall into a class representing an application. The example operations in FIG. 5 are performed by the cloud-based engine that runs in the cloud. The example operations assume that one or more unclassified packets have been forwarded from a local engine executing on a firewall as described in reference to FIG. 3.

At block 501, the cloud-based engine obtains one or more packets detected by and forwarded from the firewall. Each of the obtained packets may comprise a header and payload or a designated part of the payload. The portion of the packet to be forwarded to the cloud-based engine (e.g., a portion of the payload) can be defined by policies stored on the firewall.

At bock 503, the cloud-based engine applies signatures from a signature catalog to the packets to determine if the packets can be classified into a class representing an application. The cloud-based engine can maintain indications of a plurality of classes corresponding to applications and a corresponding criterion or criteria for classifying packets into each of the classes. The criterion/criteria for classifying packets into a class indicate a signature(s) from the signature catalog which represents the same application as the class such that packets are classified into the class if the signature indicated in the criterion/criteria matches to the packets. The signature catalog comprises each of the signatures, such as application signatures and context-based signatures applied with decoders for known network protocols, which have been predefined based on network traffic sent to/from an application. The signature catalog stored in the cloud can be distinguished from the signatures stored on the firewall against which the packets are initially evaluated in that the signatures stored on the firewall are a subset of the signatures of the signature catalog. If a signature is known or has been defined for the application associated with the session during which the packets were detected, applying the signatures of the signature catalog should result in a match so that the packets can be classified into a corresponding class.

At block 505, the cloud-based engine determines if the packets can be classified into one of the classes based on signature matching. The packets can be classified into a class if one of the signatures of the signature catalog matched to the packets. If the packets can be classified into a traffic class, operations continue at block 507. If the packets cannot be classified into a traffic class, operations continue at block 509.

At block 507, the cloud-based engine communicates an indication of class of the packets and the matching signature to the firewall. The class of the packets is the one corresponding to the signature to which the packets matched. The indication of the class may be a name, ID, etc. of the class or application which it represents. The signature communicated to the firewall is the signature to which the packets matched.

At block 509, the cloud-based engine determines if the packets can be classified into a generic traffic class. Generic traffic classes represent classes of applications having common characteristics, such as "web browsing" for browser-based applications or "unknown_TCP" for applications using an unknown Transmission Control Protocol (TCP)

port. The cloud-based engine can evaluate the packets based on a set of generic traffic classes and corresponding criteria for classifying packets into one of the generic traffic classes, where the criteria may indicate one or more characteristics which should be exhibited by packet headers and/or payloads for being classified into the corresponding generic traffic class. The cloud-based engine evaluates the packets against these criteria to determine if one of the criteria are satisfied. If the packets can be classified into a generic traffic class, operations continue at block 511. If the packets cannot be classified into a generic traffic class, operations continue at block 513.

At block 511, the cloud-based engine communicates an indication of the generic traffic class to the firewall. The cloud-based engine communicates a name, ID, etc. of the generic traffic class to the firewall. While the generic class does not have corresponding signatures defined for a known application, the generic class into which the packets are classified allows the firewall to enforce security policies defined at the level of the generic class of applications rather than security policies defined at the level of port numbers and/or network protocols.

At block 513, the cloud-based engine designates the packets for signature creation. Designating the packets for signature creation can include sending the packets to an external server, for example, where packets that could not be classified are stored. The cloud-based engine may also associate with the packets a port number, source address, destination address, and/or network protocol extracted from packet headers or traffic decoding by which the packets can be distinguished so that similar traffic can be aggregated for creation of a common signature and traffic class.

At block 515, the cloud-based engine communicates to the firewall that the packets cannot be classified by application. The communication to the firewall may indicate that the packets cannot be classified into any of the classes corresponding to applications or that the packets can be classified as unknown traffic. Packets detected during the session can thus be treated as unknown traffic for the purpose of applying firewall policies.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 413 and 415 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
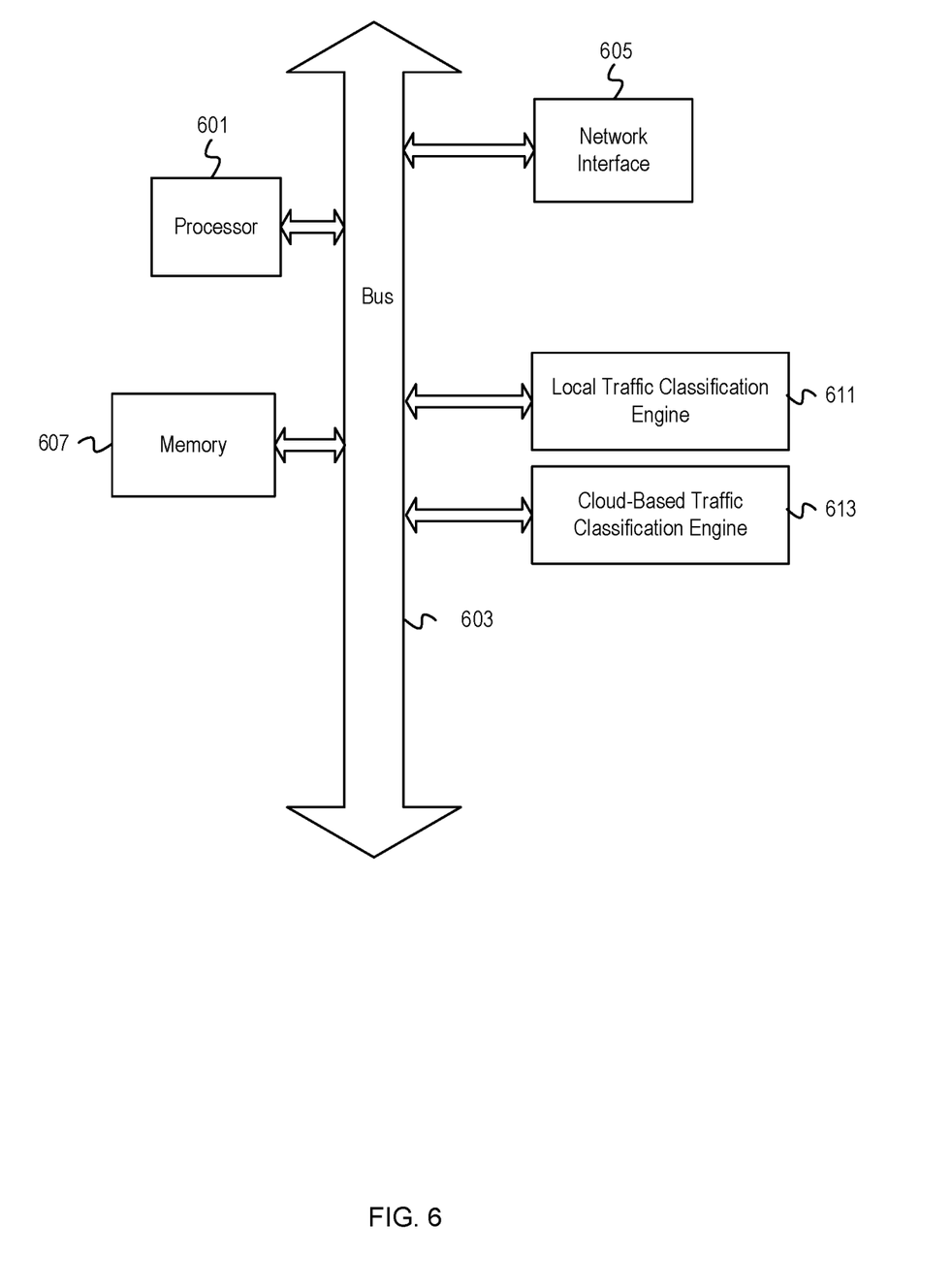
FIG. 6 depicts an example computer system with a local traffic classification engine and a cloud-based traffic classification engine.

FIG. 6 depicts an example computer system with a local traffic classification engine and a cloud-based traffic classification engine. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes local traffic classification engine 611 and cloud-based traffic classification engine 613. The local traffic classification engine 611 analyzes network traffic to classify the network traffic based on the associated application and forwards unknown network traffic to the cloud-based traffic classification engine 613 for identification. The cloud-based traffic classification engine 613 classifies network traffic forwarded by the local traffic classification engine 611 based on the associated application by leveraging a more extensive catalog of network traffic classes than is available to the local traffic classification engine 611. The local traffic classification engine 611 and the cloud-based traffic classification engine 613 do not necessarily execute on the same computer system. For instance, the local traffic classification engine 611 can execute on a firewall, and the cloud-based traffic classification engine 613 can execute in a cloud. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the preceding sufficiently describes example embodiments, language is somewhat constrained when describing innovations. Moreover, regional and national intellectual property (IP) offices have varying requirements. The following description and corresponding flowcharts attempt to disclose the technology in slightly different language in light of the constraints of language and myriad national/regional IP office requirements. The phrasing "executing program code" refers to program code executing with any of a myriad of executing implementations, such as a computer, security appliance, virtual machine, cloud-based service, etc.

Figure 7:
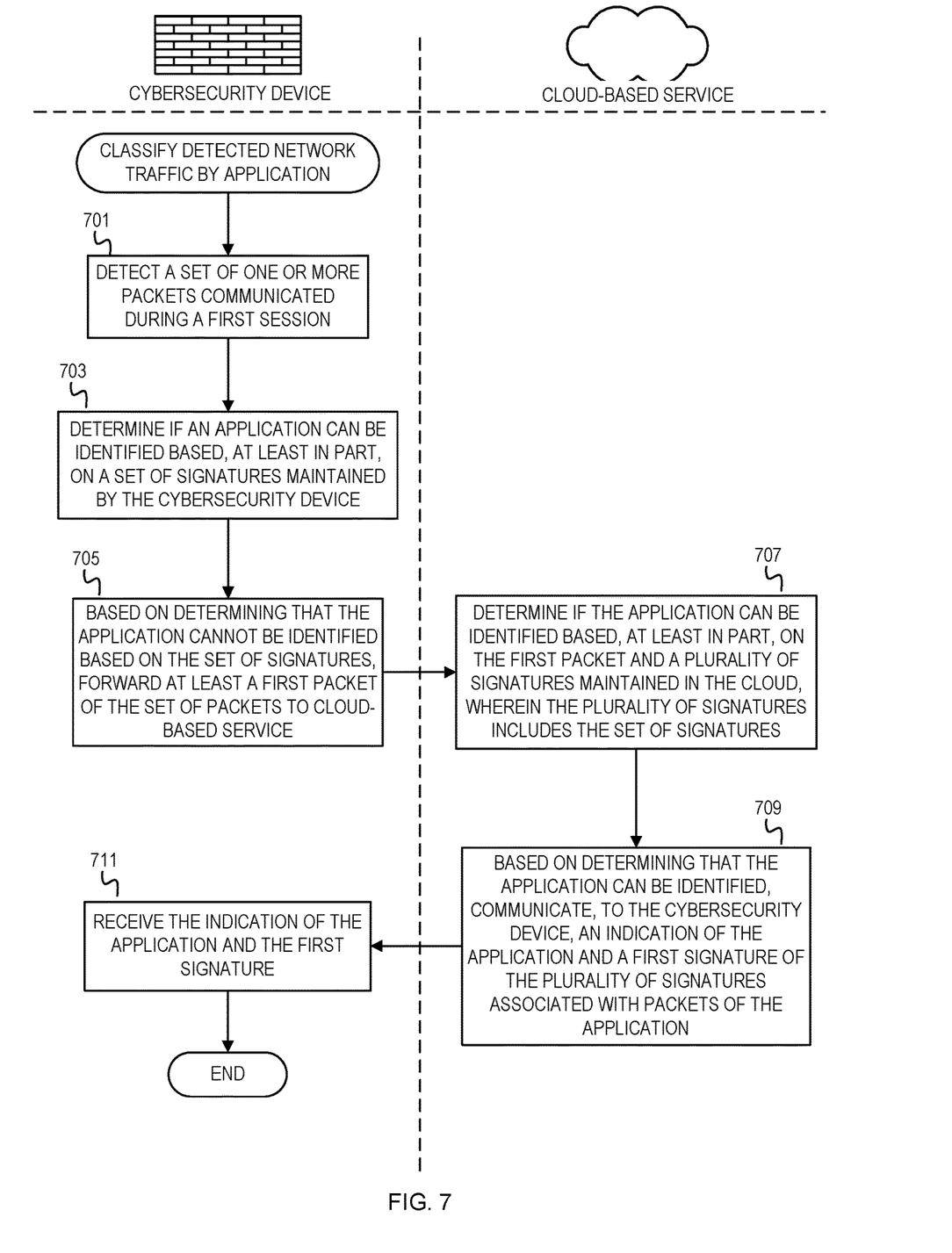
FIG. 7 is a flowchart of example operations for classifying detected network traffic by application.

FIG. 7 is a flowchart of example operations for classifying detected network traffic by application. At block 701, executing program code of a cybersecurity device (e.g., a firewall) detects a set of one or more packets communicated during a first session. At block 703, executing program code of the cybersecurity device determines if an application can be identified based, at least in part, on a set of signatures maintained by the cybersecurity device. At block 705, based on determining that the application cannot be identified based on the set of signatures maintained by the cybersecurity device, executing program code of the cybersecurity device forwards at least a first packet of the set of packets to a cloud-based service. At block 707, executing program code of the cloud-based service determines if the application can be identified based, at least in part, on the first packet and a plurality of signatures maintained in a cloud in which the cloud-based service runs, wherein the plurality of signatures includes the set of signatures. At block 709, based on the determining that the application can be identified, executing program code of the cloud-based service communicates, to the cybersecurity device, an indication of the application and a first signature of the plurality of signatures associated with packets of the application. At block 711, executing program code of the cybersecurity device receives the indication of the application and the first signature.

Figure 8:
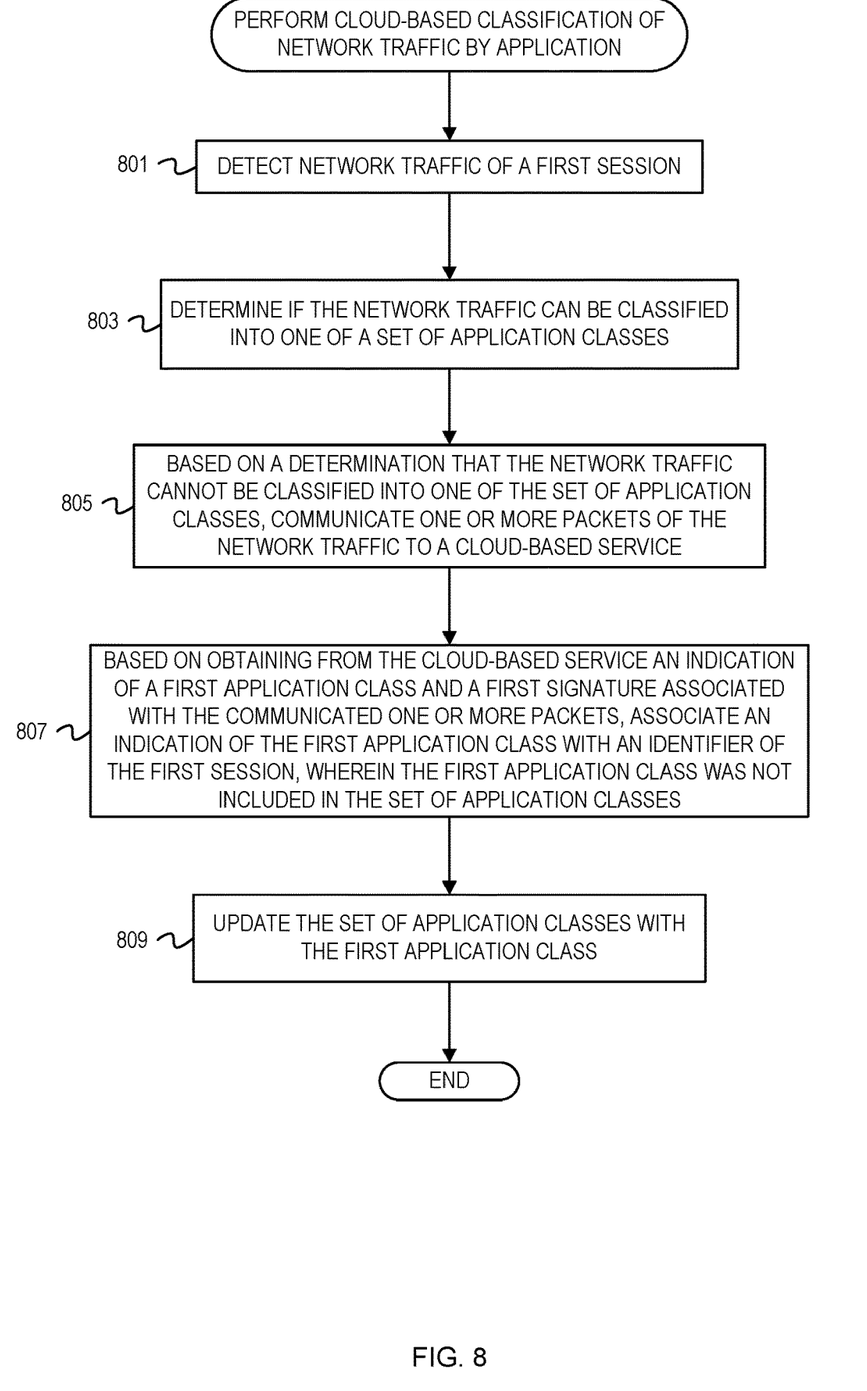
FIG. 8 is a flowchart of example operations for performing cloud-based classification of network traffic by application.

FIG. 8 is a flowchart of example operations for performing cloud-based classification of network traffic by application. At block 801, executing program code detects network traffic of a first session. At block 803, executing program code determines if the network traffic can be classified into one of a set of application classes. At block 805, based on a determination that the network traffic cannot be classified into one of the set of application classes, executing program code communicates one or more packets of the network traffic to a cloud-based service. At block 807, based on obtaining from the cloud-based service an indication of a first application class and a first signature associated with the communicated one or more packets, executing program code associates an indication of the first application class with an identifier of the first session, wherein the first application class was not included in the set of application classes. At block 809, executing program code updates the set of application classes with the first application class.

Figure 9:
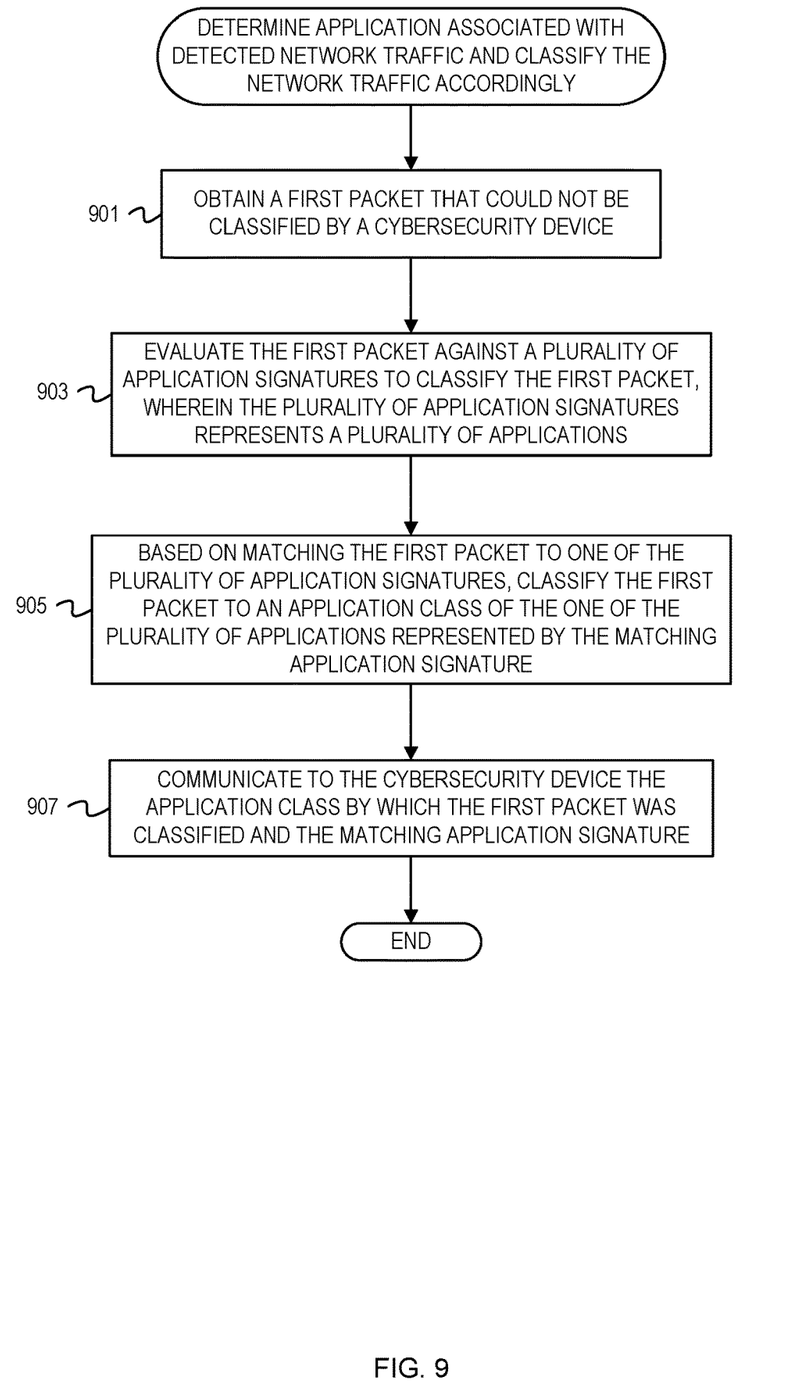
FIG. 9 is a flowchart of example operations for determining an application associated with detected network traffic and classifying the network traffic accordingly.

FIG. 9 is a flowchart of example operations for determining an application associated with detected network traffic and classifying the network traffic accordingly. At block 901, executing program code obtains a first packet that could not be classified by a cybersecurity device. At block 903, executing program code evaluates the first packet against a plurality of application signatures to classify the first packet, wherein the plurality of application signatures represents a plurality of applications. At block 905, based on matching the first packet to one of the plurality of application signatures, executing program code classifies the first packet to an application class of the one of the plurality of applications represented by the matching application signature. At block 907, executing program code communicates to the cybersecurity device the application class by which the first packet was classified and the matching application signature.

While the aspects of the disclosure are described with reference to various implementations and exploitations, it will be understood that these aspects are illustrative and that the scope of the claims is not limited to them. In general, techniques for increased coverage of application-based traffic classification and policy enforcement by expanding the scope of traffic classification services as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Terminology

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider. The term "cloud destination" and "cloud source" refer to an entity that has a network address that can be used as an endpoint for a network connection. The entity may be a physical device (e.g., a server) or may be a virtual entity (e.g., virtual server or virtual storage device). In more general terms, a cloud service provider resource accessible to customers is a resource owned/manage by the cloud service provider entity that is accessible via network connections. Often, the access is in accordance with an application programming interface or software development kit provided by the cloud service provider.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:

1. A method comprising:
   detecting, by a cybersecurity device, a set of one or more packets communicated during a first session;
   determining if an application to which the set of one or more packets correspond can be identified based, at least in part, on a set of signatures maintained by the cybersecurity device;
   based on determining that the application cannot be identified based on the set of signatures maintained by the cybersecurity device, forwarding at least a first packet of the set of packets to a cloud-based service;
   determining, by the cloud-based service, if the application can be identified based, at least in part, on the first packet and a plurality of signatures maintained in a cloud in which the cloud-based service runs, wherein the plurality of signatures includes the set of signatures;
   based on the cloud-based service determining that the application can be identified, communicate, to the cybersecurity device, an indication of the application and a first signature of the plurality of signatures associated with packets of the application;
   based on obtaining the first signature, classifying, by the cybersecurity device, the set of packets and subsequent packets communicated during the first session into a first class that represents the application and updating the set of signatures with the first signature; and
   based on the cybersecurity device detecting subsequent packets communicated during a second session, identifying the application as associated with the second session based, at least in part, on the updated set of signatures that includes the first signature.

2. The method of claim 1, further comprising applying, to the set of packets, a security policy which corresponds to the first class representing the application based, at least in part, on the cybersecurity device receiving the indication of the application.

3. The method of claim 1, wherein the set of signatures comprises a set of signatures defined for a corresponding set of applications, wherein the plurality of signatures comprises a plurality of signatures defined for a corresponding plurality of applications, and wherein the plurality of applications includes the set of applications.

4. The method of claim 1,
   wherein determining if an application can be identified comprises applying the set of signatures to the set of packets to determine if a match can be identified, and
   wherein determining, by the cloud-based service, if the application can be identified comprises applying the plurality of signatures to the first packet to determine if a match can be identified.

5. The method of claim 4, wherein the first signature is included in the plurality of signatures but is not included in the set of signatures, and wherein determining that the application can be identified comprises determining that the first packet matches the first signature of the plurality of signatures.

6. The method of claim 1, further comprising,
   based on detecting a set of one or more packets communicated during a third session, determining if an application associated with the third session can be identified based, at least in part, on the set of signatures maintained by the cybersecurity device;
   based on determining that an application for the third session cannot be identified, determining if network traffic having at least one of a source address, a destination address, a port number, and a network communication protocol in common with the set of packets of the third session was previously determined to be unknown; and
   based on determining that network traffic having at least one of the source address, destination address, port number, and network communication protocol in common with the set of packets of the third session was previously determined to be unknown, determining that the set of packets of the third session are unknown traffic without forwarding any of the set of packets to the cloud-based service.

7. The method of claim 1, further comprising, based on the cloud-based service determining that an application cannot be identified, designating the first packet for creation of an application signature.

8. The method of claim 1, wherein classifying the set of packets and subsequent packets of the first session into the class corresponding to the application comprises associating an indication of the application with an identifier of the first session.

9. The method of claim 1, wherein the plurality of signatures comprise application signatures and context-based signatures applied with decoders for known network protocols.

10. One or more non-transitory machine-readable media having program code stored thereon, the program code comprising instructions executable by a processor, the instructions comprising:
    first instructions to,
      detect at least a first packet communicated during a first session;
      determine whether an application to which the first packet corresponds can be identified based, at least in part, on a set of signatures;
      based on a determination that the application cannot be identified based on the set of signatures, forward the first packet to a service for classification;
      based on identification of the application by the service and obtaining from the service a first signature that corresponds to the application, classify the first packet and subsequent packets of the first session into a first class that represents the application and update the set of signatures with the first signature;
      based on detection of subsequent packets communicated during a second session, identify the application as associated with the second session based, at least in part, on the updated set of signatures that comprises the first signature; and
    second instructions to,
      based on receipt of the first packet, determine whether the application can be identified based, at least in part, on the first packet and a plurality of signatures maintained by the service, wherein the plurality of signatures includes the set of signatures and the first signature; and
      based on a determination that the application can be identified, communicate, to a first device from which the first packet was forwarded, an indication of the application and the first signature of the plurality of signatures.

11. The non-transitory machine-readable media of claim 10, wherein the first instructions to classify the first packet and subsequent packets of the first session into the first class corresponding to the application comprise instructions to associate an indication of the application with an identifier of the first session.

12. The non-transitory machine-readable media of claim 10, wherein the set of signatures comprises a set of signatures defined for a corresponding set of applications, wherein the plurality of signatures comprises a plurality of signatures defined for a corresponding plurality of applications, and wherein the plurality of applications includes the set of applications.

13. The non-transitory machine-readable media of claim 10,
wherein the first instructions to determine whether an application can be identified comprise instructions to apply the set of signatures to the first packet to determine if a match can be identified, and
wherein the second instructions to determine whether the application can be identified comprise instructions to apply the plurality of signatures to the first packet to determine if a match can be identified.

14. The non-transitory machine-readable media of claim 13, wherein the second instructions to determine that the application can be identified comprise instructions to determine that the first packet matches the first signature of the plurality of signatures.

15. A system comprising:
a cybersecurity device comprising a first processor and a first computer-readable medium; and
a server comprising a second processor and a second computer-readable medium,
wherein the first computer-readable medium has instructions stored thereon that are
executable by the first processor to cause the cybersecurity device to,
detect a set of one or more packets communicated during a first session;
determine if an application to which the set of packets correspond can be identified based, at least in part, on a set of signatures maintained by the cybersecurity device;
based on a determination that the application cannot be identified based on the set of signatures maintained by the cybersecurity device, forward at least a first packet of the set of packets to the server;
based on identification of the application by the server and receipt of a first signature corresponding to the application, classify the set of packets and subsequent packets of the first session into a first class that represents the application and update the set of signatures with the first signature; and
based on detection of subsequent packets communicated during a second session, identify the application as associated with the second session based, at least in part, on the updated set of signatures that comprises the first signature;
wherein the second computer-readable medium has instructions stored thereon that are
executable by the second processor to cause the server to,
based on receipt of the first packet from the cybersecurity device, identify the application corresponding to the first packet based on matching the first packet to the first signature of a plurality of signatures accessible to the server; and
communicate, to the cybersecurity device, an indication of the application and the first signature.

16. The system of claim 15, wherein the instructions executable by the first processor to cause the cybersecurity device to classify the set of packets and subsequent packets of the first session into the class corresponding to the application comprise instructions executable by the first processor to cause the cybersecurity device to associate an indication of the application with an identifier of the first session.

17. The system of claim 15,
wherein the instructions executable by the first processor to cause the cybersecurity device to determine if an application can be identified comprise instructions executable by the first processor to cause the cybersecurity device to apply the set of signatures to the set of packets to determine if a match can be identified, and
wherein the instructions executable by the second processor to cause the server to identify the application comprise instructions executable by the second processor to cause the server to apply the plurality of signatures to the first packet and match the first packet to the first signature.

18. The system of claim 17, wherein the first signature was included in the plurality of signatures but not in the set of signatures, and wherein the instructions executable by the second processor to cause the server to determine that the application can be identified comprise instructions executable by the processor to cause the server to determine that the first packet matches the first signature of the plurality of signatures.

19. The system of claim 15, wherein the second computer-readable medium further comprises instructions executable by the second processor to cause the server to, based on a determination that an application cannot be identified, designate the first packet for creation of an application signature.

20. The system of claim 15, wherein the first computer-readable medium further comprises instructions executable by the first processor to cause the cybersecurity device to, based on detection of a set of one or more packets communicated during a third session, determine if an application associated with the third session can be identified based, at least in part, on the set of signatures maintained by the cybersecurity device;
based on a determination that an application for the third session cannot be identified, determine if network traffic having at least one of a source address, a destination address, a port number, and a network communication protocol in common with the set of packets of the third session was previously determined to be unknown;
and based on a determination that network traffic having at least one of the source address, destination address, port number, and network communication protocol in common with the set of packets of the third session was previously determined to be unknown, determine that the set of packets of the third session are unknown traffic without forwarding any of the set of packets to the server.

* * * * *